United States Patent Office 2,846,323
Patented Aug. 5, 1958

2,846,323

MOLD LUBRICANTS FOR GLASS

Paul Oppliger, Midland, Mich., assignor to Dow Corning Corporation, Midland, Mich., a corporation of Michigan No Drawing. Application March 12, 1956
Serial No. 570,709

2 Claims. (Cl. 106—38.22)

This invention relates to novel release agents for glass articles.

It has long been the custom to employ paraffin oils as mold lubricants in the preparation of glass containers. In order to employ the paraffin oil it is necessary to use large amounts on the mold. This gives rise to excessive smoking with the consequent accumulation of oily soot in the upper portions of the building. As a result a fire hazard is constantly present in most plants employing this material. Fires caused from this soot have damaged or destroyed many glass plants. It would be highly desirable therefore to have a mold lubricant which would not give rise to excessive smoking and hence avoid the fire hazard.

Attempts to do this by employing emulsions of paraffin oils fail due to the fact that these emulsions do not satisfactorily release the glass. This is true even though graphite is employed in the emulsion.

It has long been known that silicones are excellent release agents. In fact silicone resins have been suggested for use as mold release agents for glass. However, to employ resins, it is necessary to coat the entire inner surface of the mold with a fairly thick film of resin thereby giving rise to excessive expense which prohibits the use of these materials on a commercial scale.

Attempts have also been made to employ silicone fluid emulsions in the release of glass articles. Whereas some success has been obtained it is found that the silicone fluid apparently does not satisfactorily wet the molds and imperfect release is often obtained.

The applicant has found unexpectedly that a combination of two ingredients, neither of which work satisfactorily alone, gives excellent release for glass articles.

It is the object of this invention to provide a siloxane emulsion for use in the release of glass articles, which use is economical enough to be feasible in a highly competitive industry. Another object is to provide a release material which avoids the smoking and its attendant fire hazard. Other objects and advantages will be apparent from the following description.

This invention relates to a mold release fluid for glass consisting essentially of an oil-in-water emulsion of from .1 to 1% by weight methylpolysiloxane fluid, from .1 to 2% by weight of paraffin oil, from .002 to .05% by weight colloidal graphite, the remainder of the emulsion being essentially water.

In general the emulsions of this invention also contain one or more emulsifying agents. For the purpose of this invention any of the common emulsifying agents whether anionic, cationic or non-ionic can be employed. The amount of emulsifying agent is not critical although they are generally employed in amount less than 20% based on the weight of the emulsion. It is also desirable but not essential that the emulsions contain water softening agents such as chelating agents.

The emulsions of this invention may be prepared in any suitable fashion but the preferred method is to emulsify the silicone and thereafter add the colloidal graphite and subsequently the paraffin oil. In general the paraffin oil is added as a mixture of oil and an emulsifying agent. The mixture is then agitated until a homogeneous emulsion is obtained.

Any methylpolysiloxane fluid and any paraffin oil (i. e. any petroleum oil) can be used in the emulsions of this invention. The siloxane can be composed of any fluid combination of $SiO_2$, monomethyl, dimethyl and trimethyl siloxane units.

The release agents of this invention are applied to the delivery equipment between the tank and the mold and also the inner surface of the mold. This can be done by any suitable fashion but preferably it is done by spraying.

The advantages of the compositions of this invention are particularly apparent in the release from intricate parts from the mold such as those having sharp curvatures such as around the neck of bottles and where there is printing or other relief work on the surface of the mold.

The folowing example is illustrative only and should not be construed as limiting the invention which is properly delineated in the appended claims.

Example 1

7 parts of an aqueous colloidal graphite suspension containing 22% by weight graphite was added to 100 parts by weight of a siloxane emulsion having the composition 35% by weight of a trimethyl end-blocked dimethylpolysiloxane fluid, 2% by weight of trimethyl nonyl ether of polyethylene glycol, .5% by weight of sodium alkyl aryl sulfonate and 62.5% by weight water.

Three quarts of this silicone-graphite emulsion were diluted with 50 gallons of water and then 2 quarts of the paraffin oil composition containing 90% by weight paraffin oil, 5% by weight of polyoxyethylene sorbitan monooleate and 5% by weight polyoxyethylene sorbitan trioleate were added to the diluted siloxane-graphite emulsion. The mixture was then agitated until a uniform emulsion was obtained.

This emulsion was then sprayed on the delivery equipment and molds of machines making glass containers. Excellent release was obtained. There was little or no mold buildup and there was no smoking or rusting of the molds and there was good lubrication of the glass throughout the process. As a result this material was eminently satisfactory for use in glass making.

That which is claimed is:

1. A mold release for glass consisting essentially of an oil-in-water emulsion of from .1–1% by weight of methylpolysiloxane fluid, from .1 to 2% by weight of paraffin oil, from .002 to .05% by weight colloidal graphite and the remainder being essentially water.

2. A mold release for glass consisting essentially of an oil-in-water emulsion of from .1 to 1% by weight methylpolysiloxane fluid, from .1 to 2% by weight of paraffin oil, from .002 to .05% by weight colloidal graphite, emulsifying agent and the remainder being essentially water.

References Cited in the file of this patent

UNITED STATES PATENTS 2,549,535    Skooglund _____ Apr. 17, 1951

OTHER REFERENCES

Dow Corning Silicone II Mold Release Agents for Rubber and Plastics, 1948, pages 6 and 7.
Dow Corning Silicone Fluids, 1947, publication of Dow Corning Corp.